(12) United States Patent
Spain

(10) Patent No.: US 7,089,971 B2
(45) Date of Patent: Aug. 15, 2006

(54) GUIDE TOOL FOR TELECOMMUNICATIONS CABLES

(76) Inventor: Thomas Francis Spain, 628 County Route 401, Westerlo, NY (US) 12193

( * ) Notice: Subject to any disclaimer, the term of this patent is extended or adjusted under 35 U.S.C. 154(b) by 325 days.

(21) Appl. No.: 10/626,001

(22) Filed: Jul. 24, 2003

(65) Prior Publication Data

US 2005/0016617 A1    Jan. 27, 2005

(51) Int. Cl.
   *B21F 1/02*   (2006.01)
(52) U.S. Cl. .................. 140/147; 140/123; 29/755; 29/758; 29/759
(58) Field of Classification Search ............... 29/755, 29/748, 758, 759, 754; 19/754; 59/78.1; 140/123, 147
See application file for complete search history.

(56) References Cited

U.S. PATENT DOCUMENTS

| | | | |
|---|---|---|---|
| 3,087,984 A * | 4/1963 | Waranch | ............... 174/135 |
| 3,989,338 A * | 11/1976 | Gosser | ............... 439/43 |
| 4,579,310 A | 4/1986 | Wells et al. | |
| 4,998,343 A * | 3/1991 | Costello | ............... 29/857 |
| 6,540,312 B1 | 4/2003 | Lane | |
| 2002/0096671 A1 | 7/2002 | Johnson | |

FOREIGN PATENT DOCUMENTS

WO    WO0239559    5/2002

* cited by examiner

*Primary Examiner*—George Nguyen
*Assistant Examiner*—Hung C. Le

(57) ABSTRACT

A guide tool for organizing and identifying telecommunications cables during network cabling installation. Said guide tool is comprised of a solid, flexible material with multiple openings arranged in a curvilinear pattern around an arch. Cables are placed through the openings and pulled a desired distance. The guide tool is then slid by hand along the cables and the cables are secured in a bundle as they emerge from the back of the guide tool. Upon reaching the desired distance, cables are removed and a subsequent set is placed through the openings. The arch is positioned so that the secured bundle of the initial set passes through the arch. This placement maintains the guide tool on substantially the same path as the initial set, enabling the user to secure the subsequent set along substantially the same path as the initial set. This process is repeated for remaining set.

19 Claims, 5 Drawing Sheets

GUIDE TOOL FOR TELECOMMUNICATIONS CABLES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a tool and process of using the tool for guiding cables and, more particularly, to guides and tools for organizing and identifying a plurality of telecommunications cables during network cable installation.

2. Description of Related Art

At the present time during network cable installation, sets of up to twelve telecommunications cables at a time are pulled through the walls, ceilings or floors of buildings to a communications room where the sets of cables are terminated on patch panels located on equipment racks. Typically 16, 24, 32, 48 or 96 port patch panels are used. Each equipment rack may have multiple patch panels, and a large number of wires or cables are often terminated each of these patch panels. During installation these cables easily become tangled and disorganized. Tangled cables make it difficult for installers to identify cables. Tangling also makes it difficult for any future identification, replacement or repair of the cables after the completion of network cable installation.

Several devices and methods are available for organizing telecommunications cables. Many of these are permanent fixtures that attach to equipment racks, which only organize the cables once they have entered the equipment rack. An example of such a device and method of using such device is shown in U.S. Pat. No. 6,540,312. Unfortunately, the cables remain entangled from the point of emersion into the communications room to the equipment rack. It would be preferable if organization occurred from the point of emersion into the communications room to the patch panel.

Another problem with the current technology is related to their permanent installation in the communications room. These devices take up space in the communications room that could otherwise be used for additional cable. In addition, network cable installers must purchase a new device for each installation job. A tool used during installation that is not required after installation would be more space efficient. Also, a tool would be more cost-effective because it can be reused on additional installation jobs.

As current technology progresses, the space available in communications rooms is becoming increasingly limited. As a result, it is necessary that telecommunications cables are arranged in an efficient, space saving manner. Devices are available that guide cables so that they lay in horizontal rows, or a similar arrangement. Examples of devices, and methods for using the same, that guide and arrange cables in horizontal rows are shown in U.S. Pat. No. 4,579,310 and U.S. patent application No. 20020096671. This arrangement does not provide optimal conservation of space as it requires a wide path for the cables to be placed and secured. This is especially problematic in narrow, confined spaces commonly encountered in network cable installation.

A tool is available that arranges cables in a bundle, which is more space efficient. All cables intended for termination on a patch panel are placed through the openings on the tool. The tool is then moved along by hand as the cables are secured into a bundle. Each resulting bundle contains all of the cables terminated on a patch panel. For those patch panels with a large number of ports, the installer is required to guide and bundle up to 96 cables at once. Such a large number of cables are heavy and can be difficult and awkward to manage at one time. This difficulty and awkwardness is further increased when the distance to the equipment rack is large or when the designated path of the cables requires the installer to hold the tool while securing the cables. It is possible to overcome this problem by forming multiple, smaller bundles, however, having multiple bundles instead of one larger bundle is not as efficient with respect to space utilization. In addition, the free lengths of cable over which the tool must travel often become so entangled that their organization is either prevented or hindered.

It is common for installers to need to add additional cables in a communications room after the initial installation. Current technology does not provide a means by which an installer may easily add to the bundles of cables. It would be useful if a tool were available that allows an installer to add to existing bundles when new cables are introduced into a communications room.

In addition, it would be better if a tool allowed an installer to organize cables in a compact bundle by guiding and securing smaller, more manageable subsets of cables. Each smaller subset of cables would be cumulatively added to the bundle until the bundle contained each of the smaller subsets of cables that make up the cables to be terminated on a patch panel. This can be accomplished by providing a means by which an installer may guide and place subsequent sets of cables along substantially the same path as an initial bundle formed by an initial set of cables. This arrangement would provide the installer with an easier method to create cable bundles, thereby obtaining maximum efficiency with respect to the utilization of space. Such a tool would also allow an installer to add additional cables to the bundle at a later date, if necessary.

Accordingly, there is a need for a tool that maximizes the space in a communications room by efficiently organizing telecommunications cables into organized bundles which eliminates the awkwardness and difficulty associated with working with a large number of cables at one time. Upon reaching the patch panel on which cables are to be terminated, the tool should also provide the installer with the ability to dress the cables neatly in a fanned out arrangement. Furthermore, such a tool should provide a means for maintaining the identity of the cables with respect to the location they connect to.

BRIEF SUMMARY OF THE INVENTION

The present invention provides a new and novel cable guide tool and method for using the guide tool to organize and identify telecommunications cables so that the cables are arranged in a compact bundle and individual cables do not interfere with each other. The guide tool is made of a solid composition and includes a plurality of openings through which cables may be placed and an arch at the bottom of the guide tool. In addition, there is a concavity between the openings that functions as structural support for the guide tool. The openings are arranged on the tool such that cables that pass through the openings form a neat bundle as they emerge from the back of the guide and, if an initial bundle has been formed, emerge substantially around this initial bundle. These openings may be used to maintain the identity of the cables by placing cables through the openings such that consecutively ordered cables are placed through consecutive openings.

It is an object of the present invention to provide a guide tool for organizing a set or sets of cables that provides maximum space conservation. Such conservation of space may be accomplished by the arrangement of the cables in a neat bundle. It is a further object of the present invention that such a bundle be formed with minimal awkwardness and difficulty to the installer. This is accomplished by guiding and securing the more manageable sets of up to twelve cables individually instead of guiding and securing all of the sets at once.

First an initial bundle is formed and secured which consists of a first set of up to twelve cables. Each subsequent set of cables may then be guided so that the cables emerge around and are secured along substantially the same course as the bundle of cables formed by a previous set or sets of cables. The arch can be used to maintain the tool along the path of the bundle so that the subsequent set of cables passing through the openings emerge from the back of the guide tool substantially on top of the bundle passing through the arch, resulting in the organization of the cables into a space saving bundle. This process is repeated until all subsequent sets have been added to the bundle.

The ability to maintain the guide tool along the path of a secure bundle also accomplishes another object of the present invention, which is to provide a means by which installers can add cables to existing bundles at a later date. Should it be desirable to do so, the installer places the new cables through the openings and places the guide tool so that the existing bundle is contained under the arch. The additional cables are then secured around the bundle as the guide tool is slid along the new cables, thereby forming a larger bundle.

Other objects of the present invention will in part be obvious and will in part appear hereinafter.

The invention accordingly comprises the guide tool and method of using the guide tool, together with the parts, elements, and interrelationships that are exemplified in the following disclosure, the scope of which will be indicated in the appended claims.

DETAILED DESCRIPTION OF THE INVENTION

Figure 1:
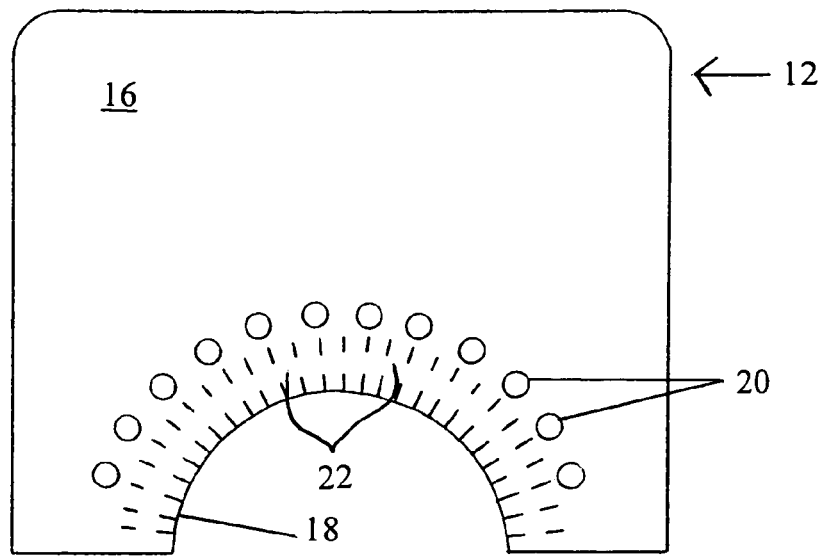
FIG. 1 is a plan view of the front of the present invention constructed in accordance with and embodying the invention.

Referring now to the drawings, in FIG. 1 there is shown a guide tool 12 for organizing and identifying a plurality or pluralities of telecommunications wires or cables during network cable installation embodying the present invention. During network cable installation, sets of up to twelve cables are pulled through the floors, ceilings and walls of buildings to a communications room where the wires or cables are terminated on patch panels, which are located on equipment racks.

Cables emerge from the ceiling or floor of a communications room and are routed in and secured to a frame along the ceiling or under the floor and then routed vertically to an equipment rack for termination on a patch panel. Multiple sets of cables are often terminated on a single patch panel. Cables are commonly pulled through a building in sets of up to twelve cables at a time with each cable corresponding to a different location in the building.

For installation purposes, the locations to which each cable corresponds may be represented numerically. For example, the cables in a first set may be labeled one through twelve and a second set may be labeled thirteen through twenty-four, and so on. Permanent identification marks may be placed on the patch panel once the cables have been terminated. These identification marks may be different than the numeric representation used for installation purposes. The ability to identify specific cables by the location that they correspond to is imperative in network cable installation. The cables typically used for connecting users to telecommunications equipment may consist of coaxial cables, category five cables, or category six cables, among others.

As used herein, the term "cable" is intended to be broad enough so as to cover any number of wires that are normally treated as a single wire, including but not limited to: a plurality of wires in a jacket, a twisted pair of wires tied or laced together, or other similar arrangements.

The preferred embodiment of the present invention consists of a guide tool and method of using the guide tool to organize and identify cables during network cable installation that maximizes the efficiency of cable management with respect to the use of space in the communications room and which maintains the identity of the cables. This organization and identification occurs from the point of emersion into a communications room to the point at which the cables are terminated on a patch panel.

The guide tool 12 is made of a solid composition 16. In the preferred embodiment, the solid composition 16 is a strong, flexible material, such as plastic. This solid plastic composition is flexible enough so as to allow the user to bend the guide tool 12 to accommodate tight corners and the like, which are often encountered during installation, yet strong enough to accommodate for any stress that may be incurred as a result of tension on the guide tool 12. Preferably, the guide tool 12 is generally square with a length and width of approximately 4 inches, making the guide tool small enough to comfortably be held in the hand of a network cable installer.

The guide tool 12 is composed of an arch 18 located along the bottom edge of the guide 12 and a plurality of openings 20 arranged in a spaced apart curvilinear relationship around the arch 18. The diameter of each opening 20 is slightly larger than the diameter of cables typically used in network cable installation so that each opening 20 may receive and capture a cable 14 and so that a cable 14 may easily slide therethrough. This diameter may be between 0.25 inches and 0.5 inches. The openings 20 enable the guide tool 12 to be slid along a set of cables 14 as the cables 14 move through the openings 20.

In the preferred embodiment, the arch 18 is substantially the shape of a half-circle and has a diameter large enough to allow a bundle of cables 14c, 14d to easily pass through. Preferably, the center of curvature of the openings 20 is substantially in alignment with the center of the arch 18 such that the openings 20 are equidistant from the arch 18. The distance between the arch 18 and each opening 20 is approximately 0.75 inches. A concavity 22 in the solid composition 16 protrudes between the openings 20 and the arch 18. This concavity 22 provides structural support for the guide tool 12, helping to maintain the guide tool 12 under any pressure or tension that may result from its use.

An initial set of cables 14a that emerges into a communications room are placed through the openings 20 on the guide tool 12 such that each opening 20 may contain up to one cable 14a. This prevents the cables 14a from overlapping and entangling during installation. Any openings 20 that do not contain a cable 14a remain empty.

Figure 2:
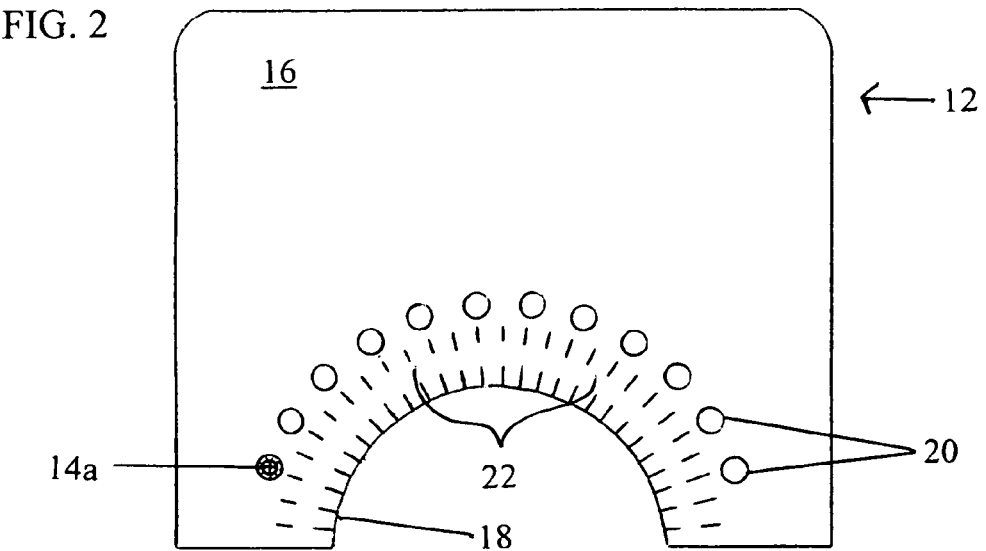
FIG. 2 is a front view of the present invention showing a cross-section of the first of an initial plurality of cables passing through an opening.

In the preferred embodiment, the initial set of cables 14a are placed through the openings 20 such that the lowest of the cables 14a, with respect to the location identity of the cables 14a, is placed through the leftmost or rightmost opening 20, and each next cable 14a is placed through each next consecutive opening 20 in order until all of the cables 14a have been placed through openings 20, leaving unused openings 20 empty. In doing so, the cables 14a are held in order and the identity of the cables 14a is maintained during installation. FIG. 2 shows a cross-section of an initial cable 14a that has been placed through the leftmost opening of the guide tool 12.

According to the preferred embodiment, after the cables 14a have been placed through the openings 20, each cable 14a is pulled through the opening 20 through which it has been placed until a length of cable 14a has been pulled through that is long enough to reach the set of ports 24a on the patch panel 26 that the cables 14a are to be terminated on. The guide tool 12 is then slid by hand in the direction of the patch panel 26 so that the cables 14a pass through the openings 20.

Figure 3:
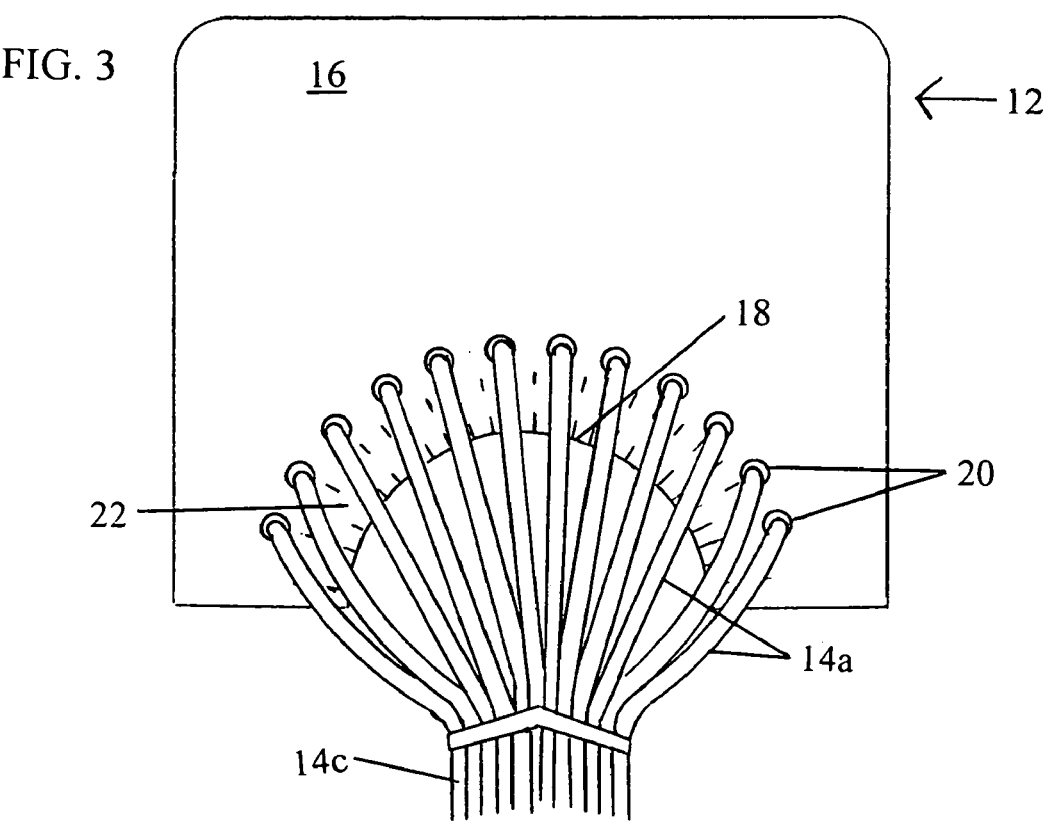
FIG. 3 is a perspective rear view showing an initial plurality of cables passing through the openings and the bundle that results.
Figure 4:
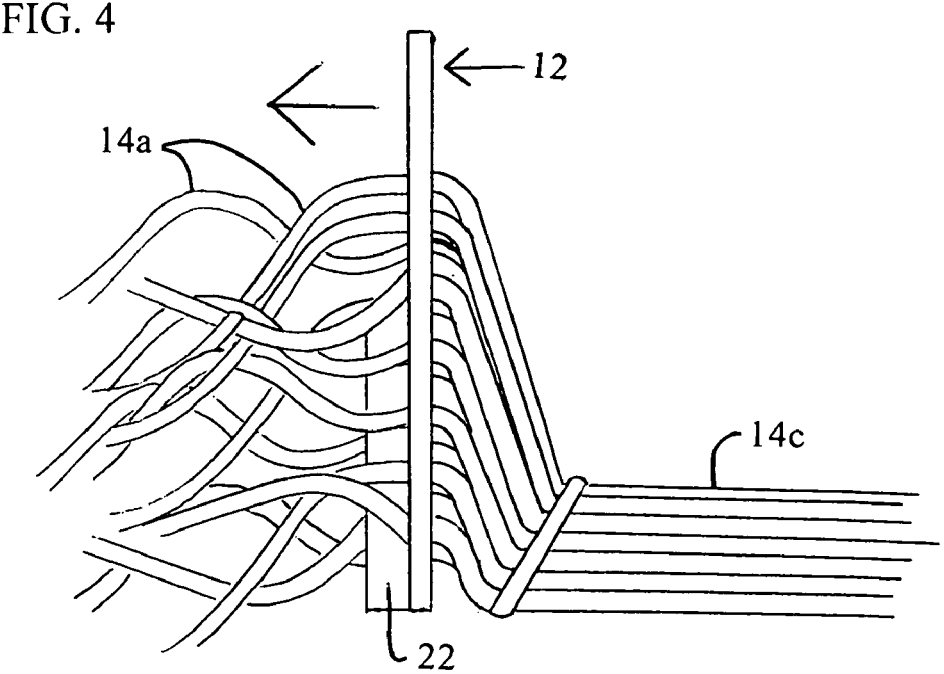
FIG. 4 is a side view of the movement of the present invention along an initial plurality of cables.

As the cables 14a emerge from the back of the guide tool 12, the cables 14a are secured in a bundle 14c using tie wraps or other fastening means. The movement of the guide tool 12 as it slides along the cables 14a and the initial bundle 14c that results from such movement is shown in FIG. 4. As shown in FIG. 3, the initial set of cables 14a emerges from the back of the guide tool 12 as the guide tool 12 is slid along the cables 14a and the cables 14a pass through the openings 20. These cables 14a may be secured to a frame, rack or other permanent fixture in the communications room, as necessary.

The curvilinear arrangement of the openings 20 facilitates the bundling arrangement that results when the cables 14a emerge from the back of the guide tool 12. The user continues to slide the guide tool 12 along the first set of cables 14a until the patch panel 26 is reached. The initial bundle 14c that results is compact and utilizes a minimal amount of space in the communications room.

Figure 7:
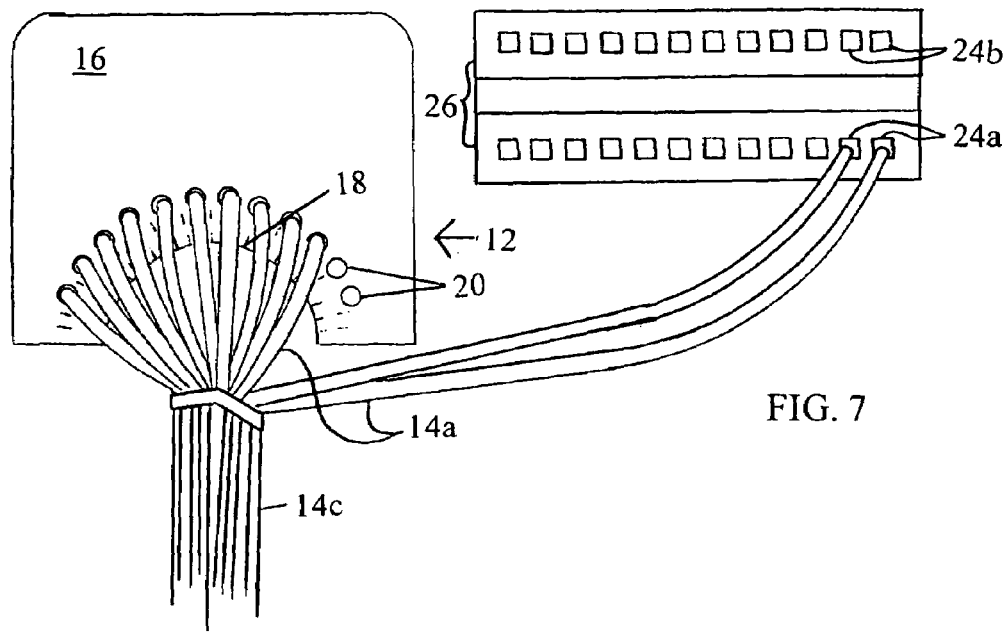
FIG. 7 is a rear view of the guide showing an initial plurality of cables as they are removed individually from the guide tool and terminated on a set of ports located on a patch panel.
Figure 8:
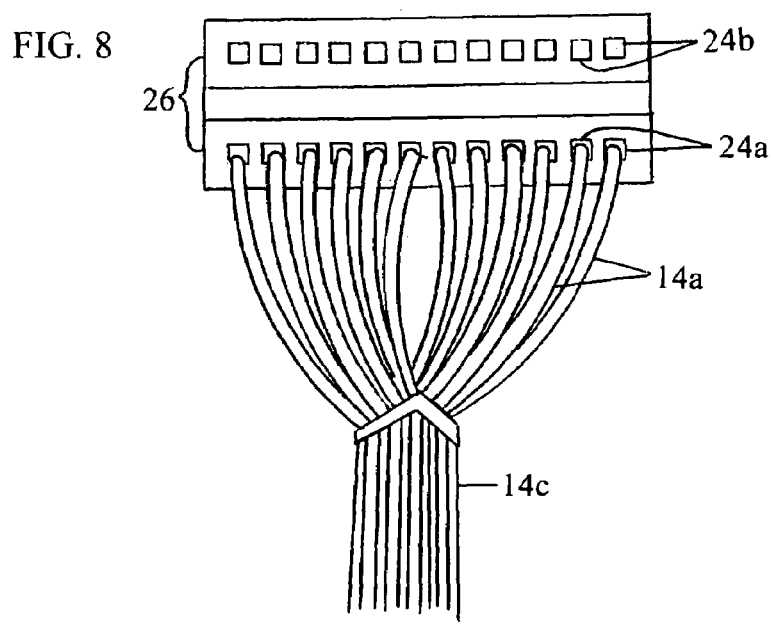
FIG. 8 shows the resulting arrangement of an initial plurality of cables after removal from the guide tool and termination on a patch panel.

In the preferred embodiment, upon reaching the patch panel 26, the cables 14a are removed from the openings 20 of the guide tool 12 one at a time and each cable 14a is terminated on its corresponding port 24a on the patch panel 26, as shown in FIG. 7. Preferably, cables 14a are removed such that the leftmost or rightmost cable 14a is removed from the guide tool 12 first and terminated on the leftmost or rightmost port 24a. The cable located in the next consecutive opening 20 is then removed and terminated. This is repeated until all of the cables 14a have been removed from the guide tool 12. As a result, the cables 14a are dressed in the desired fanned out arrangement as they connect to the ports 24a on the patch panel 26, which further facilitates future identification of the cables 14a. FIG. 8 shows the arrangement of the initial set of cables 14a, 14c that results from the preferred embodiment of the present invention.

As each cable 14a is removed and terminated, a permanent identification mark may be placed on the patch panel 26 that identifies the location in the building to which the cable 14a corresponds, thereby preserving the identity of the cable 14a after installation. This allows for future identification, removal, or repair of the cables 14a to be conducted.

In the preferred embodiment, a subsequent set of cables 14b may emerge into the communications room to be terminated on the patch panel 26 so that the cables 14b are terminated on a set of ports 24b adjacent to the ports 24a on which the initial set of cables 14a are terminated. The subsequent set of cables 14b are placed through the openings 20 on the guide tool 12 such that each opening 20 may contain up to one cable 14b. This prevents the subsequent set of cables 14b from overlapping and entangling during installation. Any openings 20 that do not contain a cable 14b remain empty.

Figure 5:
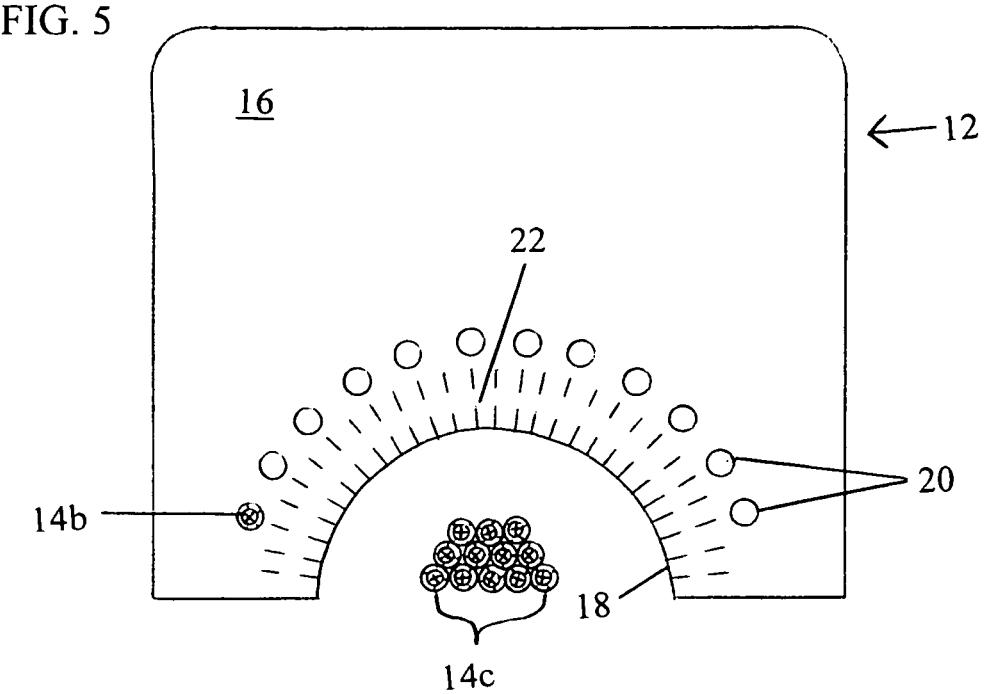
FIG. 5 is a front view showing a cross-section of a secure bundle of cables passing through the arch and a cross-section of the first of a subsequent plurality of cables passing through an opening.

In the preferred embodiment, the subsequent set of cables 14b may be placed through the openings 20 such that the lowest of the cables 14b, according to the location identity of the cables 14b, is placed through the leftmost or rightmost opening 20, as shown in FIG. 5. Each next cable 14b is then placed through each next consecutive opening 20 in order until all of the cables 14b have been placed through openings 20, leaving unused openings 20 empty. In doing so, the subsequent set of cables 14b are held in order and the identity of the cables 14b is maintained during installation.

According to the preferred embodiment, after the cables 14b have been placed through the openings 20, each cable 14b is pulled through the opening 20 through which it has been placed until a length of cable 14b has been pulled through that is long enough to reach the patch panel 26.

The guide tool 12 can then be placed so that the initial bundle 14c passes under the arch 18. FIG. 5 shows a cross-section of a cable 14b placed through an opening 20 and a cross-section of the initial bundle 14c positioned under the arch 18. The guide tool 12 is then slid by hand towards the patch panel 26 so that the cables 14b pass through the openings 20 while the initial bundle 14c passes under the arch 18.

Figure 6:
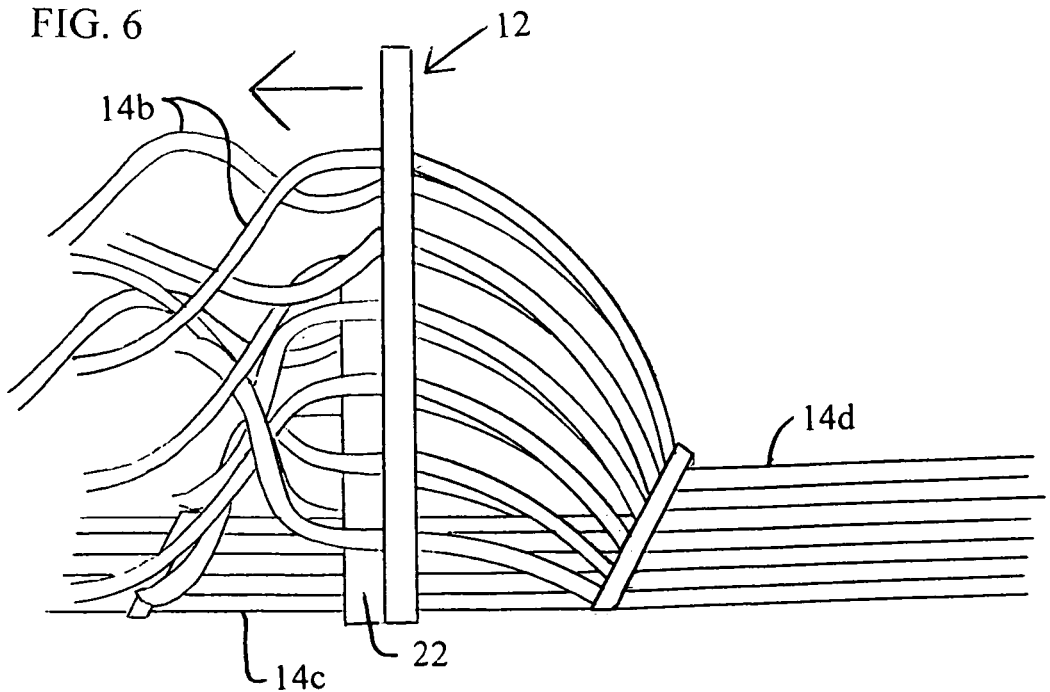
FIG. 6 is a side view showing the movement along a subsequent plurality of cables as a secure bundle of cables passes through the arch.
Figure 9:
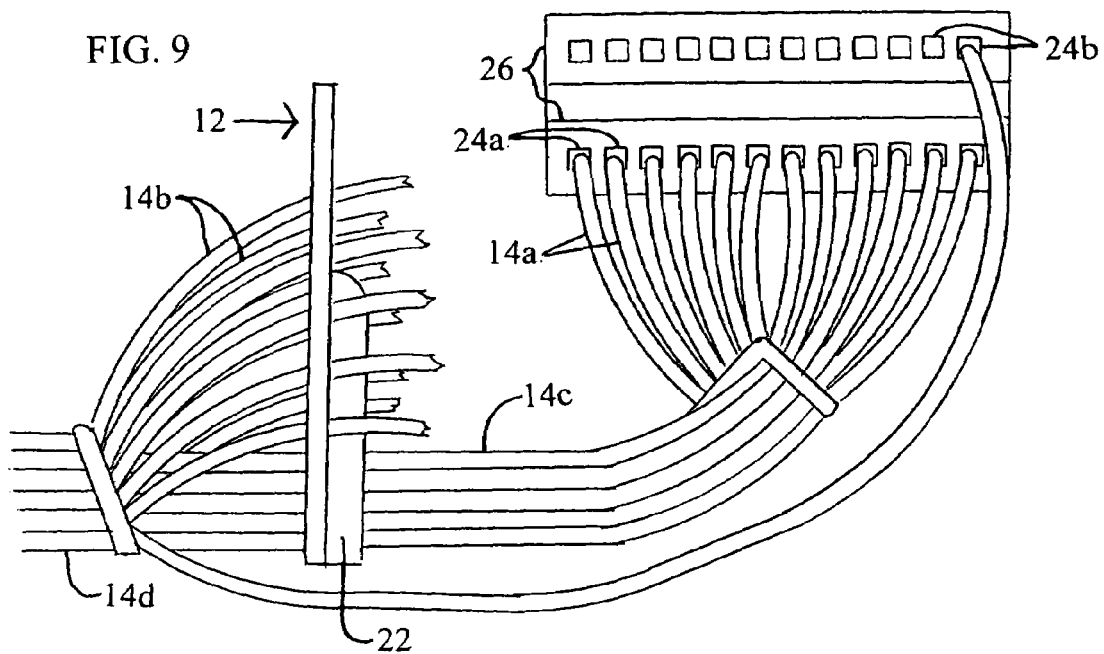
FIG. 9 is rear view of the guide tool showing a subsequent plurality of cables as they are removed individually from the guide tool and terminated on an additional set of ports on a patch panel.

The user slides the guide tool 12 along the subsequent set of cables 14b until the patch panel 26 is reached. FIG. 6 shows the guide tool 12 as it is slid by hand along a subsequent set of cables 14b as the initial bundle 14c simultaneously passes under the arch 18. This maintains the guide tool 12 along substantially the same path as the initial bundle 14c while the subsequent set of cables 14b is simultaneously organized. As shown in FIGS. 6 and 9, the subsequent set of cables 14b may be secured in a bundle 14d that is cumulative to the initial bundle 14c as the cables 14b emerge from the back of the guide tool 12.

The spatial arrangement of the openings 20 and the arch 18 results in the cables 14b emerging from the back of the guide tool 12 substantially around the initial bundle 14c such that a larger bundle 14d is formed which consists of the initial set of cables 14a and the subsequent set of cables 14b. This results in the arrangement of the cables 14a, 14b in a manner in which the cables 14a, 14b are not tangled and which minimizes the amount of space that they require in the communications room.

In the preferred embodiment, upon reaching the patch panel 26, the cables 14b are removed from the openings 20 of the guide tool 12 one at time and terminated on a set of ports 24b on the patch panel 26 located adjacent to the ports 24a on which the initial set of cables 14a has been terminated. Cables 14b may be removed such that the leftmost or rightmost cable 14b is removed from the guide tool 12 first and terminated on the leftmost or rightmost port in the set of ports 24b. FIG. 9 shows the rightmost cable 14b removed from the guide tool 12 and terminated on the rightmost port 24b on the patch panel 26 directly above the ports 24a on which the initial set of cables 14a are terminated.

The cable 14b located in the next consecutive opening 20 is then removed and terminated. This is repeated until all of the cables 14b have been removed from the guide tool 12 and terminated on the patch panel 26. This results in the cables 14b dressing neatly to the patch panel 26 in the desired fanned out arrangement, similar to the arrangement of the initial set of cables 14a.

Figure 10:
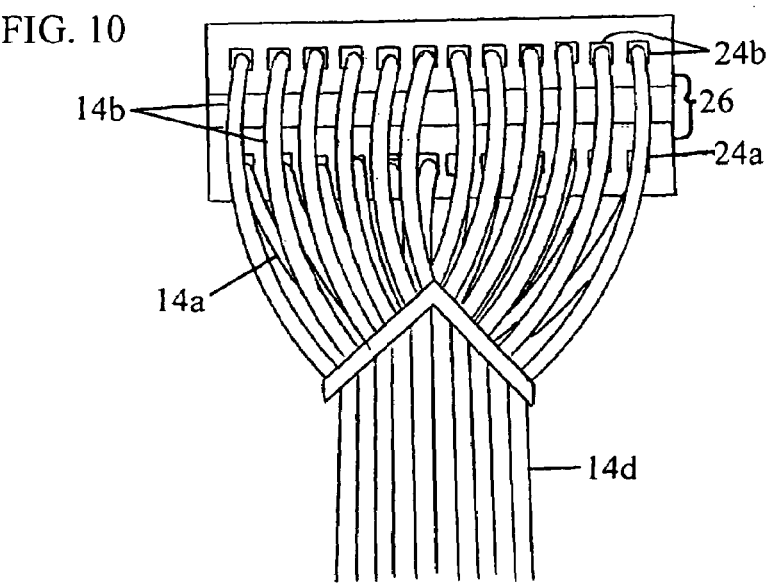
FIG. 10 shows the arrangement of both pluralities of cables after removal from the guide and termination on a patch panel.

As each cable 14b is removed and terminated, a permanent identification mark may be placed on the patch panel 26 that identifies the location to which the cable 14b corresponds, thereby preserving the identity of the cables 14b. Future identification, repair, or removal of the cables 14b is possible as a result. FIG. 10. shows the arrangement of both sets of cables 14a, 14b on the patch panel 26 as well as the bundle of cables 14d that results from the use of the preferred embodiment of the present invention.

In the preferred embodiment, any remaining subsequent sets of cables are organized and identified using the preferred embodiment. These remaining sets of cables are added to the bundle 14d by placing the cables through the openings, placing the arch over the bundle 14d, and sliding the guide tool 12 along the bundle 14d until the patch panel 26 is reached. As the guide tool 12 is moved along the cables, the cables are secured around the bundle 14d. This is repeated until all sets of ports on the patch panel 26 have been used.

In an alternative embodiment, among others, a cable 14a, 14b is placed through an opening 20 and pulled a distance sufficient to reach the patch panel 26 on which the cables 14a, 14b are to be terminated. Each next cable 14a, 14b is then placed through the next consecutive opening 20 and then pulled a length sufficient to reach the patch panel 26 on which the cable 14a, 14b is to be terminated until all cables 14a, 14b have been placed through openings 20 and pulled the necessary distance.

Those skilled in the art will likely perceive various modifications and alterations to the invention. All matter contained in the above description and depicted in the accompanying drawings should be construed in an illustrative and not limiting sense. The appended claims are to be construed to cover all modifications within the true scope and spirit of the present invention as defined in the appended claims.

I claim:

1. A guide tool of solid composition for organizing and identifying a plurality or pluralities of wires or cables, said guide tool comprising:
    (a) an arched opening at an edge of said guide tool;
    (b) a plurality of openings arranged in a spaced apart curvilinear relationship; and
    (c) a concavity in said solid composition, located between said arched opening and said plurality of openings, wherein said arched openings, said plurality of openings, and said concavity are spatially arranged on said solid composition so that a plurality of wires or cables may temporarily be inserted through said plurality of openings and that said guide tool may be moved along said plurality of wires while a bundle of wires or cables may simultaneously pass through said arched opening.

2. The guide tool claimed in claim 1, wherein said plurality of openings are arranged on a curve substantially in alignment with said arched opening.

3. The guide tool claimed in claim 1, wherein said guide tool is substantially square in shape.

4. The guide tool claimed in claim 1, wherein each said opening has a sufficient diameter such that a cable or wire may pass therethrough.

5. The guide tool claimed in claim 1, wherein said arched opening is a half-circle and is large enough to allow a bundle of wires or cables to pass through.

6. The guide tool claimed in claim 1, wherein said concavity is a supporting means for said guide tool.

7. The guide tool claimed in claim 1, wherein said solid composition is made of a strong, flexible material.

8. A process for managing and organizing a plurality or pluralities of wires or cables, said process comprising the steps of:
    (a) providing a guide tool of solid composition for organizing and identifying a plurality or pluralities of wires or cables, wherein said guide tool comprises an arched opening at an edge of said guide tool, a concavity in said solid composition, and a plurality of openings arranged in a curvilinear spaced apart relationship on said guide tool, wherein said concavity is located between said arched opening and said plurality of openings;
    (b) placing an initial plurality of wires or cables through said plurality of openings in said guide tool;

(c) pulling said initial plurality of wires or cables through said plurality of openings a distance;

(d) sliding said guide tool along said initial plurality of wires or cables such that said initial plurality of wires or cables passes through said plurality of openings in said guide tool; and (e) removing said initial plurality of wires or cables from said plurality of openings of said guide tools.

9. The process claimed in claim 8, wherein after placing said initial plurality of wires or cables through said openings, each opening contains up to one wire or cable and unused openings remain empty.

10. The process claimed in claim 8, wherein after step (e), the following steps are included:

(f) placing a subsequent plurality of wires or cables through said plurality of openings in said guide tool;

(g) pulling said subsequent plurality of wires or cables through said plurality of openings a distance;

(h) sliding said guide tool along said subsequent plurality of wires or cables such that said subsequent plurality of wires or cables pass through said plurality of openings on said guide tool; and (i) removing said subsequent plurality of wires or cables from said plurality of openings of said guide tool.

11. The process claimed in claim 10, wherein after placing said subsequent plurality of wires or cables through said openings, each opening contains up to one wire or cable and unwed openings remain empty.

12. The process claimed in claim 10, wherein said process includes securing said initial plurality of wires or cables in a bundle as said guide tool slides along said initial plurality of wires or cables.

13. The process claimed in claim 10, wherein said process includes:

a) Assigning an identifying number to each wire in said initial or subsequent plurality of wires that corresponds to the location in the building from which the cable originated; and b) providing a means for maintaining the assigned identifying number of each wire in said initial or subsequent plurality of wires or cables.

14. The process claimed in claim 13, wherein said process includes placing said initial or subsequent plurality of wires or cables through said plurality of openings such that the lowest numbered wire or cable, according to the assigned numerical identity of said wires or cables, is placed through one of the openings of said plurality of openings and each next consecutively numbered wire or cable is placed through each next consecutive opening in the plurality of openings in numerical order until all wires or cables have been placed through said plurality of openings in said guide tool.

15. The process claimed in claim 14, wherein said process includes removing said initial or subsequent plurality of wires or cables from said openings of said guide tool such that the wire or cable located in either the leftmost or rightmost opening in said guide tool is removed first and each wire or cable located in each next consecutive opening is removed in order until all of the wires or cables have been removed from said guide tool.

16. The process claimed in claim 12, wherein said process includes guiding said subsequent plurality of wires or cables with said guide tool such that said subsequent plurality of wires or cables is guided substantially along said bundle of said initial plurality of wires or cables.

17. The process claimed in claim 16, wherein said process includes sliding said guide tool such that said bundle of said initial plurality passes through said arch of said guide tool.

18. The process claimed in claim 17, wherein said process includes securing said subsequent plurality of wires or cables around said bundle of said initial plurality of wires or cables as said guide tool slides along said subsequent plurality of wires or cables.

19. The process claimed in claim 18, wherein said process includes repeating said process for any remaining plurality or pluralities of wires or cables.

* * * * *